June 3, 1969   W. A. WISEMAN   3,447,908
DETECTION SYSTEMS FOR GAS CHROMATOGRAPHY
Filed Dec. 21, 1965

United States Patent Office 3,447,908
Patented June 3, 1969

3,447,908
DETECTION SYSTEMS FOR GAS CHROMATOGRAPHY
William Antony Wiseman, Boyn Valley Road, Maidenhead, Berkshire, England
Filed Dec. 21, 1965, Ser. No. 515,408
Claims priority, application Great Britain, Dec. 23, 1964, 52,326/64
Int. Cl. G01n *31/12*
U.S. Cl. 23—255                                              9 Claims

ABSTRACT OF THE DISCLOSURE

A detection system for detecting combustible material carried in the vapour phase in a gas stream, for example from a gas chromatography column, which includes an oxygen generator for generating oxygen to be mixed with the gas stream containing combustible material; a reaction site where combustion takes place, a detector, such as a flame-ionisation detector, for detecting a change in the reaction when the proportion of combustible material changes; feedback means connecting the detector and the oxygen generator for altering the current through the generator so as to adjust the amount of oxygen generated in the direction required to compensate for the change in amount of the combustible material; and means for measuring and/or recording the current through the generator.

---

This invention relates to the detection of combustible material carried in the vapour phase in a gas stream, and has especial application to the detection and estimation of the organic compounds in the effluent from a gas chromatography column.

The present invention, which is related to that of my earlier co-pending application. Ser. No. 462,678, filed June 10, 1965 provides a detection system consisting of the combination of the following elements: an inlet for a stream of gas containing a variable proportion of combustible material; a generator for generating a supply of combustion-promoting gas to be mixed with the stream of gas containing combustible material, to promote combustion; a reaction site where the combustion takes place; a detector for detecting some characteristic change in the reaction when the proportion of combustible material changes; feed-back means from the detector for altering the amount of work carried out by the generator for combustion-promoting gas, so as to adjust the amount of combustion-promoting gas generated in the required direction to compensate for the change in amount of combustible material present; and means for measuring and/or recording the amount of work carried out by the generator.

Although various types of gaseous combination can be envisaged, combustion of hydrogen and carbon, etc. in the form of organic compounds, using oxygen, is that form most convenient for normal use. This lends itself admirably to use with a gas-chromatography column in which the effluent carrier gas contains varying proportions of organic material as the analysis proceeds.

One form of the detection system of the present invention which may be so used consists of an inlet for the gas containing combustible material; an oxygen-generating electrolytic cell the oxygen from which can mix with the incoming gas; a combustion chamber for burning the oxygen and combustible material; a flame ionisation detector downstream of the combustion chamber so that the combustion gases may be fed into it to detect the presence of any ions arising from organic compounds in the combustion gas; a feed-back means to increase the amount of oxygen generated by the electrolytic cell, or to initiate such oxygen generation, when ions are detected in the flame; and means for measuring and/or recording the work carried out by the cell in producing the increased amount of oxygen.

A convenient form of combustion chamber is, for instance, a catalytic combustion chamber consisting essentially of a heated platinum wire at the surface of which the combustion reaction between the oxygen and the elements in the combustible material may take place.

The flame ionisation detector may suitably consist of a supply of hydrogen and of oxygen (e.g. as air) providing a flame into which the combustion gases are fed.

The feed-back system is conveniently a flame ionisation amplifier together with a further amplifier to provide a signal to control the electrolytic cell.

Another form of the detection system of the present invention is rather more complex and consists of an inlet for the gas containing combustible material; an oxygen generating electrolytic cell the oxygen from which can mix with the incoming gas; a flame-ionisation detector provided with a gas supply to the flame of stoichiometric proportions, this flame-ionisation detector being so positioned that the oxygen and gas containing combustible material may be fed into it for rapid combustion; feed-back means to adjust the amount of oxygen generated by the electrolytic cell when the ion concentration in the flame changes; and means for measuring and/or recording the amount of work carried out by the electrolytic cell.

As a refinement of this system it is envisaged to provide an oxygen detector downstream of the flame-ionisation detector to measure the oxygen concentration in the combusted gases and further feed-back means from the oxygen detector to the electrolytic cell to adjust the oxygen generated to compensate for the change in the amount of combustible material burnt.

The gas supply to the flame in this second embodiment of the present invention is conveniently an electrolytic cell producing hydrogen and oxygen, which are then recombined by combustion in stoichiometric proportions.

Preferably a condenser for the water vapour produced by this flame is provided downstream of the flame (but before the oxygen detector if this is present) to remove liquid water from the system.

It will be appreciated that in both embodiments of the invention the response in the recording and/or measuring instrument is linear, notwithstanding the fact that the flame detector or oxygen detector are non-linear and in prior proposals, not utilising feedback, have had to be calibrated.

The invention will be further described with reference to the accompanying drawings, in which.

Figure 1:
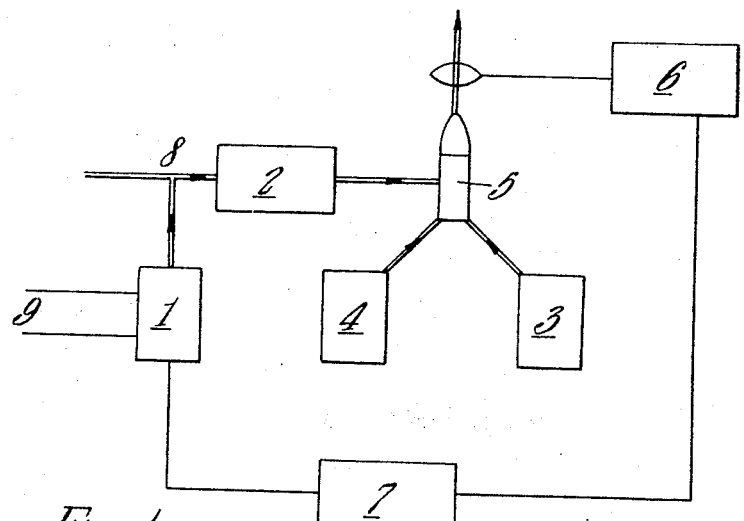
FIGURE 1 represents a block diagram of an embodiment of the invention.

In the example of the invention shown in FIGURE 1, 1 is an electrolytic cell capable of generating oxygen and 2 is a combustion chamber consisting of a heated platinum wire which will cause a complete reaction between organic compounds and oxygen to form carbon dioxide and water. 3 is a supply of hydrogen and 4 a supply of air to a flame ionisation detector 5. 6 is an emplifier amplifying the signal from the flame ionisation detector and 7 is a further amplifier capable of feeding current to cell 1. The carrier gas from (e.g.) a chromatographic column enters at point 8 and the signal is measured and/or recorded at point 9.

In operation, substantially oxygen-free carrier gas enters from the chromatograph (or the system in which it is required to detect and measure organic compounds) at point 8. The flame ionisation detector 5, fed by hydrogen supply 3 and air supply 4, is sensitive to the presence of organic compounds, that is to say, the current in the flame rises when organic compounds come into it. As soon as the flame ionisation detector gives a signal that an organic compound is appearing, this signal is sent via the two amplifiers to the oxygen cell 1, where it generates sufficient oxygen to combust the organic compound in the combustion chamber, thereby reducing the signal in the flame ionisation detector to zero again. This combustion proceeds until all the organic material coming into the detecting system has been destroyed in the combustion chamber.

The current in the cell 1 is monitored and this gives the amount of oxygen generated which, in turn, is an exact indication of the amount of organic compound which has been combusted. Furthermore, this signal will be directly related to the chemical formula of the organic compound, and can be predicted exactly.

This, therefore, converts the flame ionisation detector into a quantitative and absolute detector, which normally it is not.

It will be appreciated that while a flame detector has been shown, any other detector detecting organic compounds or other detectable and combustible material may also be used in this embodiment.

Figure 2:
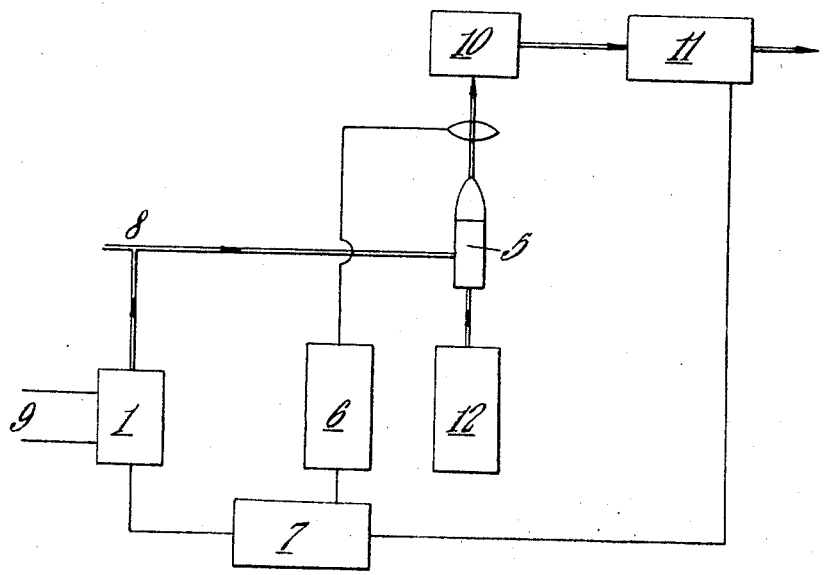
FIGURE 2 represents a block diagram of a second embodiment of the invention.

In FIGURE 2 like references to those in FIGURE 1 indicate like elements. 10 is a condenser for water vapour, and 11 is a specific oxygen detector. 12 is an electrolytic cell providing a stoichiometric hydrogen and oxygen mixture for the flame of the flame-ionisation detector.

In operation, cell 1 produces a certain amount of oxygen all the time. Cell 12 produces a stoichiometric $2H_2+O_2$ mixture for burning in flame-ionisation detector 5. The chromatographic column effluent (for example) is fed in at 8 and mixed with the oxygen and led into the flame of the detector 5. The combustion of any organic compound present will provide an ionisation in the flame with a very quick response time (due to the high energy present in the pre-existing flame). Of course, these compounds cannot be burnt in the burner except by the use of oxygen from cell 1 because the oxygen generated from cell 12 is completely required for burning the hydrogen from the same cell. This signal may be fed back via flame ionisation amplifier 6 and feed-back amplifier 7 to cell 1 so that this produces more oxygen. The effluent gases from the flame can be led through a condenser 10 which condenses the water vapour (this condenser is not essential, but it is extremely useful) or sometimes may be led directly to a suitable specific oxygen detector 11. This oxygen detector only records the oxygen generated in cell 1 less any oxygen which has been used for combustion of the organic compound. It will monitor oxygen excesses or deficiencies arising from the discrepancy in the oxygen produced by cell 1 and the changing requirements of the organic material in the effluent stream. The output from this detector 11 is also fed back to amplifier 7, whose output is therefore modified in such a way that account is taken of this oxygen excess or deficiency. The resulting signal given by cell 1 may be subtracted from the current used to generate oxygen and this constitutes a signal which will exactly correspond to the amount of oxygen combusted in the flame for the complete and stoichiometric combustion of any compound which it is desired to detect.

Various modifications may be made within the scope of the invention. For instance, in practice the gas inlet 8 may be made into a suitable construction of cell 1 to allow for rapid response with respect to mixing of oxygen with the gas. Also the oxygen detector may be of any convenient type. For example, it may be a Hersch detector as described in British Patent No. 913,473 or a solid electrolytetype detector.

Other aspects of the invention are also envisaged; this invention also consists in a gas-chromatographic system including a detection system as described above, and in a method of analytical gas chromatography in which such a detection system is employed.

I claim:
1. A detection system comprising a combination of the following elements
   (a) inlet means for a stream of gas containing a variable proportion of combustible material
   (b) a gas generator for generating a supply of combustion-promoting gas, the generator being activated by passage of electric current through the generator
   (c) means for mixing the stream of gas containing combustible material and the combustion-promoting gas to form mixed gases
   (d) a reaction site where combustion of the combustible material in the mixed gases takes place
   (e) a detector for detecting a characteristic change in the combustion reaction at the reaction site when the proportion of combustible material changes
   (f) feed-back means connecting the detector and the gas generator whereby a signal from the detector responsive to a change in the combustion reaction alters the current through the generator so as to adjust the amount of combustion-promoting gas generated, the adjustment being such that the amount of combustion-promoting gas generated increases when the proportion of combustible material at the reaction site increases and the amount of combustion-promoting gas generated decreases when the proportion of combustible material at the reaction site decreases, and
   (g) read-out means for indicating the current through the generator.
2. A detection system as claimed in claim 1 in which: the gas generator is an oxygen-generating electrolytic cell and the detector is a flame-ionisation detector provided downstream of the reaction site so that the combustion gases are fed into the detector to detect the presence of any ions arising from organic compounds in the combustion gases.
3. A detection system as claimed in claim 2 in which the reaction site is a catalytic combustion chamber consisting essentially of a heated platinum wire at the surface of which the combustion reaction between the oxygen and the element in the combustible material takes place.
4. A detection system as claimed in claim 2 in which the flame ionisation detector comprises a supply of hydrogen and of oxygen providing a flame into which the combustion gases are fed.
5. A detection system as claimed in claim 2, in which the feed-back means is a flame ionisation amplifier together with a further amplifier to provide a signal to control the electrolytic cell.
6. A detection system comprising a combination of the following elements:
   (a) inlet means for a stream of gas containing a variable proportion of combustible material carried in the vapour phase
   (b) an electrolytic cell for generating oxygen
   (c) means for feeding the gas containing combustible material and the generated oxygen to a flame-ionisation detector
   (d) the flame-ionisation detector having a flame provided with a supply of flame gases in stoichiometric proportions, the combustible material in the presence of the generated oxygen being rapidly combusted in the flame
   (e) feed-back means connecting the detector and the electrolytic cell whereby a signal from the detector responsive to a change of ion concentration in the flame adjusts the current through the electrolytic cell, which adjusts the amount of oxygen generated by the cell, and
   (f) a read-out means for indicating the current through the electrolytic cell.
7. A detection system as claimed in claim 6, further comprising: an oxygen detector downstream of the flame- ionisation detector to measure the oxygen concentration in the combusted gases; and further feed-back means from the oxygen detector to the electrolytic cell to adjust the oxygen generated to compensate for the change in the amount of combustible material burnt.

8. A detection system as claimed in claim 6 in which the gas supply to the flame is an electrolytic cell producing hydrogen and oxygen in stoichiometric proportions.

9. A detection system as claimed in claim 6 in which a condenser for the water vapour produced by the flame is provided downstream of the flame, to remove liquid water from the system.

References Cited

UNITED STATES PATENTS 3,169,389  2/1965  Green et al.
3,342,558  9/1967  Reinecke.

MORRIS O. WOLK, *Primary Examiner.*

R. M. REESE, *Assistant Examiner.*

U.S. Cl. X.R.

23—232, 254